1,941,388

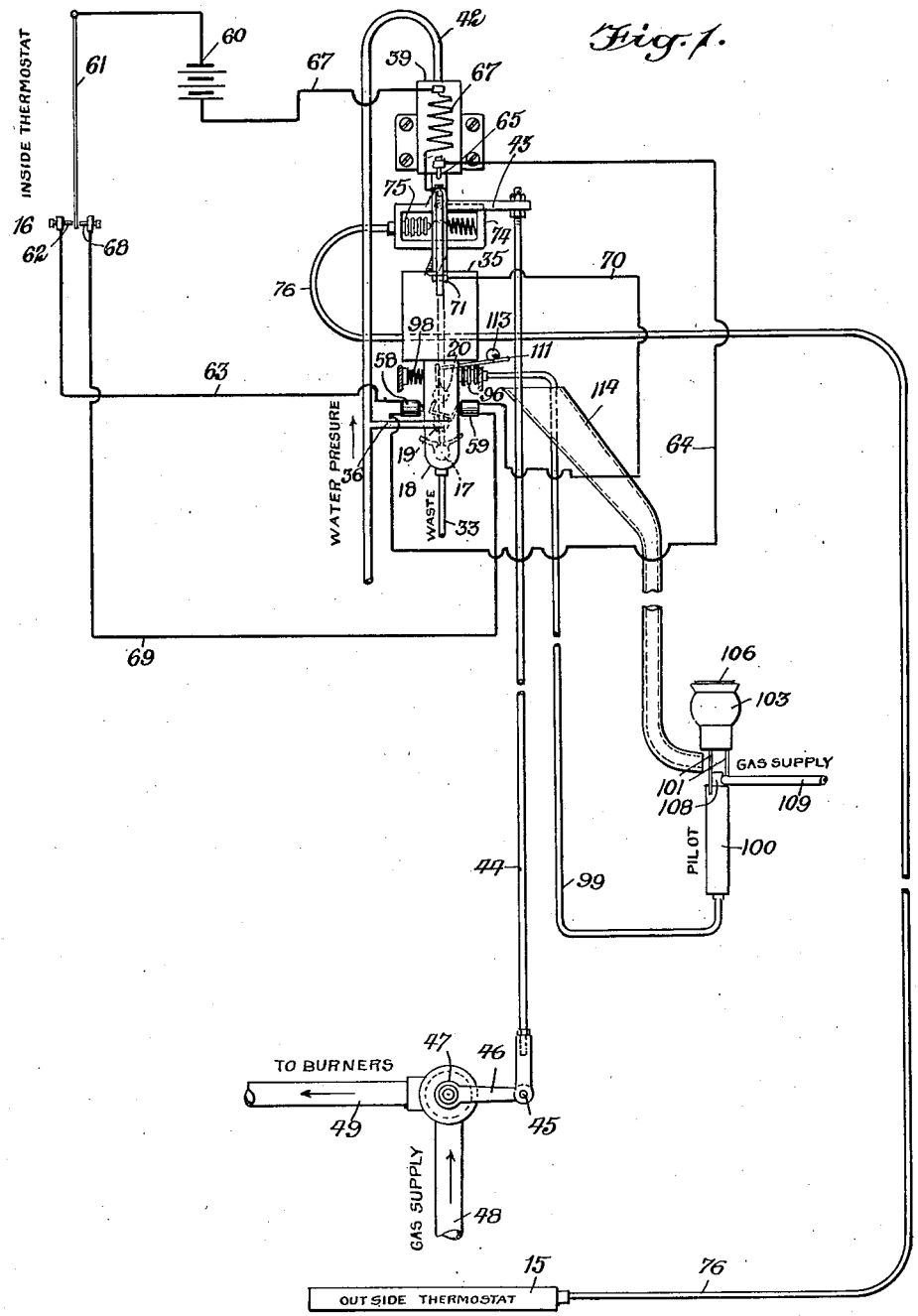

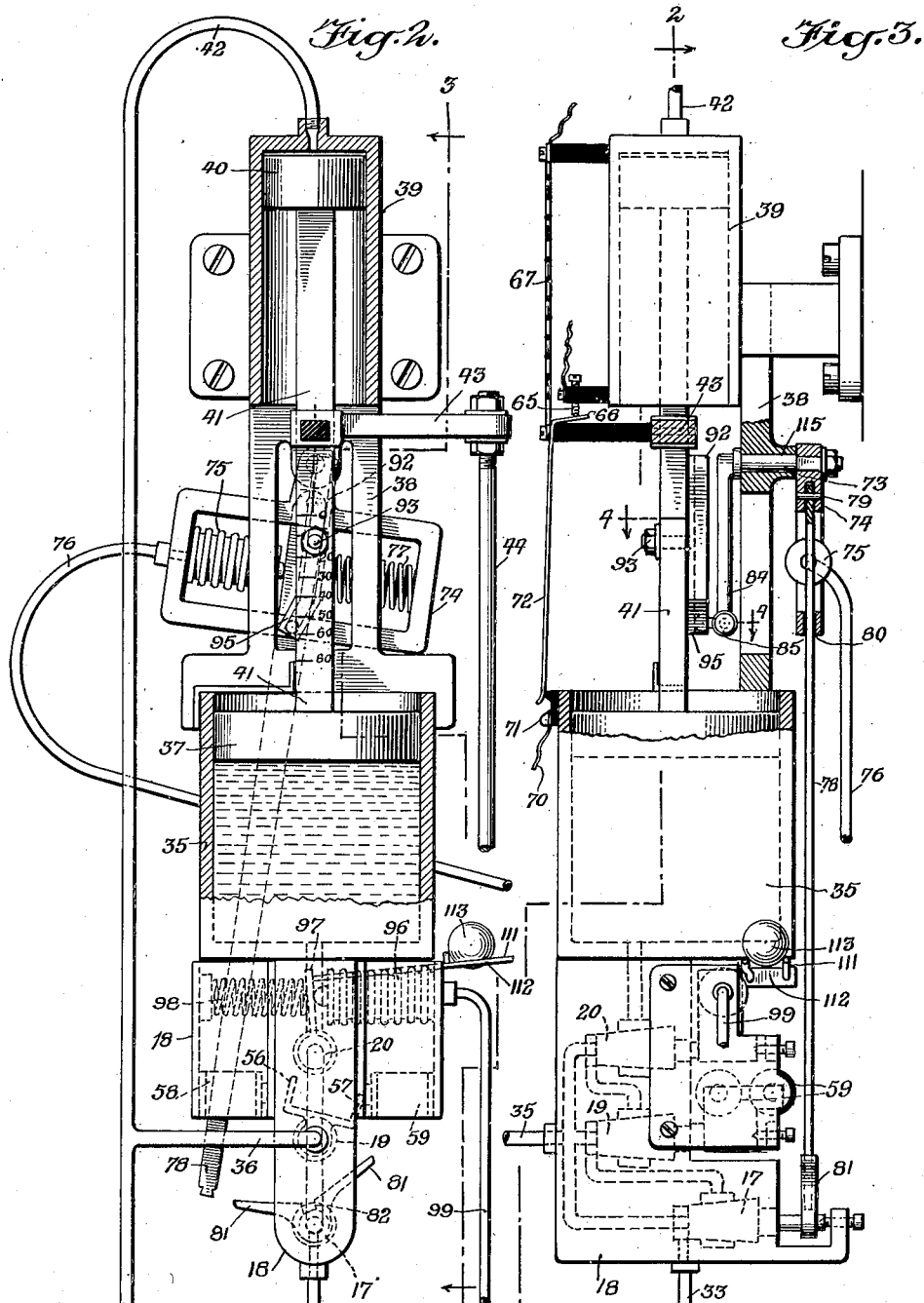
Dec. 26, 1933.  F. C. CHADBORN  1,941,388
HEAT CONTROLLING APPARATUS
Filed Aug. 6, 1930  3 Sheets-Sheet 2
INVENTOR
Frederic C. Chadborn
BY
ATTORNEYS Dec. 26, 1933.  F. C. CHADBORN  1,941,388
HEAT CONTROLLING APPARATUS
Filed Aug. 6, 1930   3 Sheets-Sheet 3
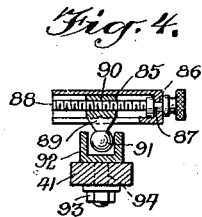
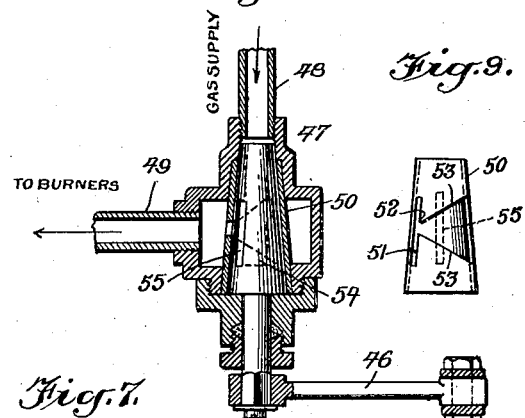
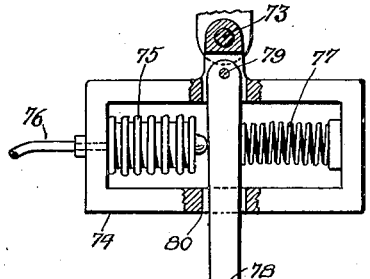
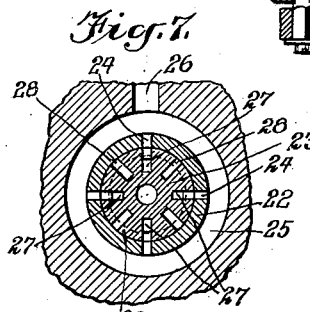
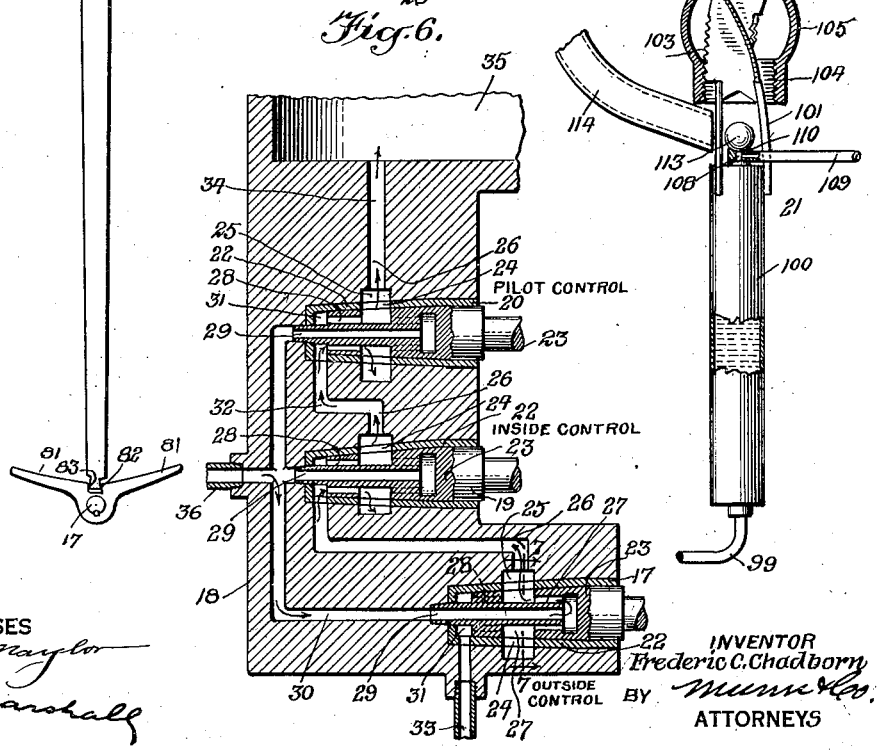
WITNESSES
INVENTOR
Frederic C. Chadborn
BY
ATTORNEYS Patented Dec. 26, 1933

UNITED STATES PATENT OFFICE 1,941,388

HEAT CONTROLLING APPARATUS

Frederic C. Chadborn, Newburgh, N. Y.

Application August 6, 1930. Serial No. 473,455

40 Claims. (Cl. 236—91)

One of the principal objects of the invention is to provide in a single unit the necessary means for the economical, efficient and safe operation and automatic control of a gas fired heating plant.

The invention also has for an object the provision of two thermostats, one of which may be disposed out of doors and the other in the building which is to be heated with unitary control means operable by the two thermostats.

The invention has for a further object to provide means continuously operable by one of the thermostats for regulating the control means, and as an additional object the provision of means operable by the other thermostat for operating the said control means.

The invention has as an additional object means by which one of the thermostatic controls may be rendered inoperative during periods in the operation of the apparatus.

Another object of the invention is to provide adjustable means to regulate the operation of the control means.

Another object of the invention is to provide a fluid pressure means under the control of one or more thermostats for operating the control means.

Still another object of the invention is to provide fluid pressure means for operating the control and to provide two valves having communication with each other and with the fluid pressure means, one of the valves being operable by one of the thermostatic means and the other being operable by the other thermostatic means, and as an additional object to provide a third valve communicating with the first mentioned valves and with the fluid pressure means, the third valve being operable by a pilot control.

Still another object of the invention is to provide a unitary valve member connected with the control means and having three connected valves which are operable independently of each other and as an additional object to connect one of the valves with the fluid pressure means, and another valve with an outlet so that with the valves in predetermined positions the fluid pressure means will be connected with the outlet, there being means to connect any one of the valves with a source of fluid pressure to operate the fluid pressure means.

The invention furthermore has as an additional object to provide a thermostatic control with a member having thermostatic means and a lever pivoted to the member to be operated by the thermostatic means and also by a movement of the member and to provide means to move the member.

Additional objects of the invention are to provide a pilot control which will serve to cut off any future supply of fuel at the main burner and also at the pilot control when the supply of fuel is interrupted and before the fuel is again lighted, and also to provide a special valve for regulating the flow of fuel to the main burner.

Additional objects of the invention will appear in the following specification in which the preferred form of the invention is described.

In the drawings similar reference characters refer to similar parts in all the views, of which Figure 1 is a diagrammatic view illustrating the invention, Figure 2 is an enlarged sectional view on the line 2—2 of Figure 3, Figure 3 is a sectional view on the line 3—3 of Figure 2, Figure 4 is a sectional view on the line 4—4 of Figure 3, Figure 5 is a sectional view illustrating the mounting for a thermostatic means and illustrating the arm operated thereby, Figure 6 is an enlarged sectional elevation showing the three control valves, Figure 7 is an enlarged sectional view on the line 7—7 of Figure 6, Figure 8 is an enlarged sectional view illustrating the main gas valve, Figure 9 is a view illustrating the main gas valve, including the sleeve and the plug, and Figure 10 is an enlarged sectional view illustrating the pilot control.

By referring to the drawings it will be seen that there are two thermostats spaced apart, the thermostat 15 being preferably disposed out of doors, while the thermostat 16 is preferably disposed indoors. As will be explained, the thermostat 15 serves to control the valve 17 in the valve block 18, while the thermostat 16 serves to control the valve 19 in the said valve block. There is also another valve 20 in the valve block which is operably controlled by the thermostatic pilot control 21 illustrated in Figure 10 of the drawings and which will be shortly described.

The three valves 17, 19 and 20 are of the same general construction, which is illustrated in transverse section in Figure 7, the cylindrical portion 22 being stationary while the central core 23 is rotatable. The cylindrical portion 22 has ports 24 which communicate with an annular chamber 25 leading to the port 26, the central core 23 having two sets of ports, one set being indicated at 27 and the other set at 28. The ports 27 lead to the right, as shown in the bottom valve in Figure 6, and then communicate through the central port 29 with the passage 30. The ports 28 lead to the left, as best shown in the upper valves in Figure 6, and then communicate with an annular passage 31. The annular passage 31 communicates with the port 26 of the adjacent valve by means of a passage 32, the annular passage 31 in the bottom valve communicating with an outlet or waste 33 and the port 26 in the upper valve communicating through a passage 34 with a cylinder 35. There is a fluid inlet pressure 36 which has branches communicating with the ports 29 in the valves.

In the cylinder 35 there is a piston 37. Supported above the cylinder 35 by a frame 38 there is a second cylinder 39, the diameter of which is considerably less than the diameter of the cylinder 35. In the cylinder 39 there is a piston 40, the pistons 37 and 40 being connected by a piston rod or member 41. The source of fluid pressure not only is connected with the fluid pressure inlet 36, but also with the top of the cylinder 39 by means of a pipe 42. It will, therefore, be seen that when a fluid is permitted to pass through one or more of the valves 17 and 19 or 20 to the cylinder 35 with the greater area of the piston 37 it will serve to move upwardly the pistons against the reduced pressure at the top of the piston 40.

To the piston rod 41 there is secured an arm 43 and supported on this arm and operable thereby there is a rod 44 which is articulated at 45 to an arm 46 for operating the main burner valve 47 which connects a gas supply 48 with a pipe 49 leading to the main burners. This main burner valve 47 is best illustrated in Figures 8 and 9 of the drawings. This valve has a cone-shaped sleeve 50 with a port which at one end is elongated transversely, as shown at 51, the sides of the port beyond the said end 51 being contracted at 52 and then diverging at 53. Disposed in the cone-shaped sleeve 50 there is a cone-shaped plug 54 which has a transverse elongated port 55. This construction is provided so that when it is desired to light the burner there will be a very considerable flow of gas from the end 51 of the port in the cone-shaped sleeve 50 through the port 55 in the cone-shaped plug 54, but when the burner has been lighted there will be, with the movement of the valve, a greatly diminished supply of gas, for after the burner has been once lighted it is not necessary to insure a full supply of gas except as may be required by the temperature. Therefore, the supply of gas will be diminished considerably and then will be increased slowly as the port 55 in the plug 54 passes from communication with the end 51 of the port in the conical sleeve to the other end of the said port.

The valve 19 is provided with two armatures 56 and 57, there being two magnets 58 and 59, the magnet 58 being disposed adjacent the armature 56 and the magnet 59 being disposed adjacent the armature 57. It will, therefore, be seen that this valve 19 will be operated electrically and the thermostat 16 illustrated in Figure 1 of the drawings is constructed with this object. The circuit for energizing the magnet 58 passes from the battery 60 through the movable arm 61 to the contact point 62 and through the wire 63 to the magnet 58, thence through the wire 64 to the contact point 65, to the contact point 66, the wire 67, which is in the form of a coil and which communicates with the wire 67 leading to the battery 60 or other source of electrical supply. The current for energizing the magnet 59 passes from the contact point 68 through the wire 69 to the magnet 59 and thence through the wire 70 to the contact point 71, thence through the contact 72 to the coil wire 67. It will be understood that with the movement of the piston rod 41 with the pistons 37 and 40 the contact member 72 may be moved upwardly, its contact point 66 contacting with the contact point 65, or may be moved in an opposite direction so that the contact member 72 will contact with the contact point 71.

When the building is warm the arm 61 of the inside thermostat will contact with the contact point 68 and the current will pass through the wire 69 to the magnet 59, which will operate the valve 19 to permit the fluid pressure to pass through its port 29 and out of its port 26, the fluid pressure passing through the valve 20, which will normally be disposed, as illustrated in Figure 6, and out of the port 26 of the valve 20 to the bottom of the cylinder 35. The pressure against the bottom of the piston 37 will then be sufficient to raise the piston 37, moving upwardly the piston rod 41, which will immediately break the circuit as the contact member 72 will be spaced from the contact point 71. With this upward movement of the piston rod 41 the arm 43 has been raised to move the rod 44 to operate the valve 47 to move the valve 47 to a position where the valve plug 54 is along the diverging sides of the port in the conical valve sleeve to cut off the flow of gas through the valve 47.

When the temperature in the building falls below a predetermined point the arm 61 will contact with the contact point 62 and the current will flow through the wire 63 to energize the magnet 58, the current passing through the wire 64 to the contact point 65, to the contact point 66, the wire 67 and back to the battery 60, the upward movement of the piston rod 41 having brought the contact point 66 into contact with the contact point 65. This will permit the fluid to pass from the cylinder 35 through the valves 20, 19 and 17 to allow the pistons to descend, thereby through the piston rod 41 and the arm 43 moving downwardly the rod 44 to operate the valve 47. However, this action may be regulated by the outside thermostat which operates the valve 17 in a manner which will now be described.

The frame 38 has a bearing 115 in which is journaled a stud 73, a frame 74 being secured for rocking with this stud 73. The frame 74 is preferably rectangular in shape and at one end there is a thermostatic bellows 75 which is connected through a tube 76 with the outside thermostat 15, the frame 74 also having a spring 77, there being disposed between the thermostatic bellows 75 and the spring 77 an operating arm 78, the operating arm 78 being pivoted to the frame 74 at 79 and extending through an opening 80 in the bottom of the rectangular frame 74. It will be understood that the thermostatic bellows 75 will press against one side of the operating arm 78 and the spring 77 will press against the opposite side of the operating arm and that with any increase in pressure from the thermostat 15 the operating arm 78 will be pressed against the resiliency of the spring 77 and that with any reduced pressure from the thermostat 15 the spring 77 will move the operating arm 78 to the left, depending on the extent of the reduction in pressure in the said thermostat 15. The valve 17 has diverging arms 81 with a recess 82 at its central portion and the lower terminal 83 of the operating arm 78 fits into the recess 82 when the valve 17 is neutral and there is no passage through the said valve 17. However, when, under the influence of the thermostat 15 and the associated parts, the operating arm 78 is moved in one direction it will serve to connect the fluid pressure inlet 36 with its port 29, while when moved in the opposite direction it will close this connection and open connection between its port 26 and the outlet or waste 33.

Secured for rocking with the stud 73 there is an arm 84, the arm 84 having a transverse member 85, best shown in Figure 4 of the drawings, the transverse member 85 having a bearing 86 in which is journaled a member 87 having a screw 88, there being mounted on the screw 88 a guide member 89 which has a threaded opening 90 in which the screw 88 meshes. Therefore, it will be seen that the guide member 89 may be adjusted transversely of the arm 84. This guide member 89 has a bearing 91 disposed for moving in a guideway 92 which is adjustably secured to the piston rod 41 by means of a screw 93 extending from the guideway 92 through a bearing 94 in the piston rod 41. This guideway 92, as will be seen by referring to Figure 2 of the drawings, is disposed at a slight angle with reference to the path of movement of the piston rod 41 and it will also be seen by referring to Figure 2 of the drawings that the lower end 95 of the guideway 92 is disposed at an angle relatively to the remainder of the guideway. The connection between the piston rod 41 and the rectangular frame 74 with its operating arm 78 is provided to regulate the action of the valve 17 with reference to the movement of the pistons 37 and 40.

In order to determine the position to which the piston rod 41 has been moved, and thereby determine the position of the valve 47, there are indicated on the piston rod 41, as shown in Figure 2 of the drawings, degrees, there being substantially ten degrees for each one-half inch, while the last one-half inch represents twenty degrees. Therefore, there will be indicated on the piston rod 41 0, 10, 20, 30, 40, 50, 60 and 80, the distance between 60 and 80 having reference to the lower end 95 of the guideway 92 which provides for a special adjustment, as will be shortly explained.

When the temperature falls outdoors there will be a contraction in the outside thermostat 15 and consequently in the thermostatic bellows 75, which will permit the spring 77 to move the operating arm 78 to the left. This will by the means which have been described move the valve 17 and connect its ports 26 with the outlet or waste 33, the other valves 19 and 20 being in the position illustrated in Figure 6. Some of the fluid from the cylinder 35 will be permitted to pass to the outlet or waste 33, permitting the pistons 37 and 40 to move downwardly and with this downward movement the rod 44 will descend, operating the valve 47 which will permit an additional flow of gas to the burners. With this downward movement of the pistons 37 and 40 the guideway 92 will move downwardly and by means of the bearing 91 will serve to rock the arm 84, which will move the rectangular frame 74 and by means of which will bring the operating arm 78 back to neutral position, preventing further exhaust of fluid through the valve 17 to the outlet or waste 33. This provides a movement under the influence of the outside thermostat and the amount of movement will depend on the adjustment of the guideway 92 relatively to the piston rod 41, the angularity of the guideway 92 relatively to the piston 41 being adjusted as occasion may require.

When the temperature outdoors increases the thermostat 15 will increase the pressure in the thermostatic bellows 75 and move the operating arm 78 to the right. This will actuate the valve 17 and move this valve to the position illustrated in Figure 6 of the drawings to permit fluid to pass from the fluid pressure inlet 36 through the port 29 in the valve 17, out of its port 26 and through the valves 19 and 20 to the bottom of the cylinder 35. This will force the piston 37 upwardly and the guideway 92 will again by the means described move the rectangular frame 74 to bring the operating arm 78 to a position where it will serve to move the valve 17 into neutral position, where a further flow of fluid to the cylinder 35 will be prevented. Therefore, it will be seen that an operation of the valve 17 is provided, not only with a decrease in temperature, but also with an increase in temperature.

As has been explained, when the inside thermostat operates because of an increase in temperature it will energize the magnet 59 to move the valve 19 to permit fluid to pass through the port 29 and out of its port 26 and through the valve 20 to the cylinder 35 to force the piston 37 upwardly, this upward movement of the piston 37, by means of the piston rod 41 and the guideway 92, serving to rock the rectangular frame 74 to move the operating arm 78, which will serve to move the valve 17 to a position where its port 26 will communicate with the outlet or waste 33, and this irrespective of any outside temperature influence on the thermostat 15.

When the inside of the building becomes chilled and requires heat the thermostat 16 will energize the magnet 58, which will operate the valve 19 to afford communication between its port 26 and its annular passage 31, which will open communication from the cylinder 35 to the outlet or waste 33, thereby permitting the piston 37 to descend to a point determined by the outside thermostat 15. With the descent of the piston 37 the operating arm 78 will be moved back to neutral between port position with reference to the valve 17, permitting the operating arm 78 to operate the valve 17 with any change in the outside temperature.

At times in the morning and during Spring when there is a question as to whether or not heat is required, the temperature inside the building standing at substantially seventy degrees and the temperature outside at substantially seventy-one degrees, the lower portion 95 of the guideway 92 prevents the shutting-off of all heat as the added acuteness of the lower portion 95 of the guideway 92 retards the upward movement of the piston 37 and consequently the upward movement of the rod 44 which controls the valve 47. Therefore, heat will be available should the inside temperature drop. It will be understood that not only does the guideway 92 by means of the bearing member 89 serve to operate the arm 84 controlling the movement of the rectangular frame 74, but that this movement of the arm 84 with reference to the movement of the piston rod 41 is controlled by the angularity of the guideway 92 with reference to the path of movement of the piston rod 41 and that the lower end of the guideway 92 turning acutely to one side at 95 changes the action of the piston rod 41 with reference to the rectangular frame 74.

The valve 20 is held normally in the position shown in Figure 6 of the drawings by means of the thermostatic bellows 96, which presses against one side of the arm 97 of the valve 20, while a spring 98 presses against the other side of the arm 97. The thermostatic bellows 96 is connected by a tube 99 with a cylinder 100 in which is disposed a suitable fluid such as alcohol. Secured to the cylinder 100 and extending upwardly therefrom there are legs 101, preferably of copper, which have veins 102 with threads 103 with which mesh a thread 104 on a burner casing 105, the veins 102 carrying a plate 106, the opening 107 between the plate 106 and the sides of the burner casing 105 being regulated by turning the burner casing 105 relatively to the veins 102. On the cylinder 100 there is a burner port 108 to which leads a tube 109, the burner port 108 having a seat 110. The arm 97 of the valve 20 has horizontally extending arms 111 with a seat 112 on which is normally disposed a valve member 113, this valve member 113 being preferably constructed of rubber or flexible material filled with birdshot, or some other heavy material such as mercury. Disposed below the arms 111 there is a chute 114 which leads to the burner port 108 with its seat 110. As has been stated, the valve 20 is normally positioned as illustrated in Figure 6 with the horizontally extending arms 11, as illustrated in Figure 2, and with the valve member 113 disposed on its seat 112. However, should the pilot burner go out there will be a rapid decrease in temperature in the cylinder 100 and in a few seconds the pressure in the thermostatic bellows 96 will decrease sufficiently to permit the spring 98 to move the arm 97 to operate the valve 20 so that a fluid pressure supply will be directed through its port 29 to its port 26, thereby quickly raising the piston 37 to its extreme height and closing the main burner, the arms 111 will simultaneously descend permitting the valve member 113 to fall through the chute 114 to a position at the seat 110 on the burner port 108. This will serve not only to close off communication through the main gas valve 47, but also at the pilot.

What is claimed is:

1. In a heat controlling apparatus, a fluid pressure means, two valves communicating with each other, with the fluid pressure means and with an outlet, a fluid pressure inlet connected with the valves respectively, and two thermostatic means operatively connected with the valves respectively for connecting the fluid supply inlet with the fluid pressure means and the fluid pressure means with the outlet.

2. In a heat controlling apparatus, a fluid pressure means, three valves communicating with each other, with the fluid pressure means and with an outlet, a fluid pressure inlet connected with the valves respectively, two thermostatic means operatively connected with two of the valves respectively for connecting the fluid supply inlet with the fluid pressure means and the fluid pressure means with the outlet, and a pilot control means for operating the other valve.

3. In a heat controlling apparatus, a fluid pressure means, an outlet, a fluid pressure inlet, three valves each having ports affording communication between the valves and between the fluid pressure means and the outlet and serving to introduce a fluid from the fluid pressure inlet through the valves to the fluid pressure means.

4. In a heat controlling apparatus, a fluid pressure means, an outlet, a fluid pressure inlet, three valves each having ports affording communication between the fluid pressure means and the outlet and serving to introduce a fluid from the fluid pressure inlet through the valves to the fluid pressure means, two thermostatic means operatively connected with two of the valves respectively, and a pilot control means operatively connected with the other valve.

5. In a heat controlling apparatus, a fluid pressure means, an outlet, a fluid pressure inlet, two valves each having ports serving to afford communication between the fluid pressure means and the outlet and also serving to introduce a fluid from the fluid pressure inlet through the valves to the fluid pressure means, two thermostatic means for operating the valves respectively, and means on a movable member of the fluid pressure means for operating one of the thermostatic means.

6. In a heat controlling apparatus, a fluid pressure means, an outlet, a fluid pressure inlet, two valves each having ports serving to afford communication between the fluid pressure means and the outlet and also serving to introduce a fluid from the fluid pressure inlet through the valves to the fluid pressure means, two thermostatic means for operating the valves respectively, and adjustable means on a movable member of the fluid pressure means for operating one of the thermostatic means.

7. In a heat controlling apparatus, a cylinder, a piston in the cylinder, a fluid pressure inlet, a burner valve, means by which the piston is adapted to operate the burner valve, an outlet, two valves each having ports serving to afford communication between the cylinder and the outlet and to afford communication between the fluid pressure inlet and the cylinder.

8. In a heat controlling apparatus, a cylinder, a piston in the cylinder, a fluid pressure inlet, a burner valve, means by which the piston is adapted to operate the burner valve, an outlet, two valves each having ports serving to afford communication between the cylinder and the outlet and to afford communication between the fluid pressure inlet and the cylinder, and means connecting the first mentioned means with one of the valves for operating the latter.

9. In a heat controlling apparatus, a cylinder, a piston in the cylinder, a fluid pressure inlet, a burner valve, means by which the piston is adapted to operate the burner valve, an outlet, two valves each having ports serving to afford communication between the cylinder and the outlet and to afford communication between the fluid pressure inlet and the cylinder, and two thermostatic means operatively connected with the valves respectively.

10. In a heat controlling apparatus, a cylinder, a piston in the cylinder, a burner valve, means by which the piston is adapted to operate the burner valve, a fluid pressure inlet, an outlet, three valves having ports connected with each other, a port in one of the valves being connected with the cylinder and a port in another valve being connected with the outlet for connecting the cylinder through the valves with the outlet, the valves each having a port connected with the fluid pressure inlet for connecting the fluid pressure inlet with the cylinder.

11. In a heat controlling apparatus, a cylinder, a piston in the cylinder, a burner valve, means by which the piston is adapted to operate the burner valve, a fluid pressure inlet, an outlet, three valves having ports connected with each other, a port in one of the valves being connected with the cylinder and a port in another valve being connected with the outlet for connecting the cylinder through the valves with the outlet, the valves each having a port connected with the fluid pressure inlet for connecting the fluid pressure inlet with the cylinder, two thermostatic means operatively connected respectively with two of the valves, and a pilot control means operatively connected with the other valve.

12. In a heat controlling apparatus, a cylinder, a piston in the cylinder, a burner valve, a guideway, means by which the piston is adapted to operate the burner valve and to move the guideway relatively to the cylinder and at an angle to its guiding path, a fluid pressure inlet, an outlet, three valves having ports connected with each other, a port in one of the valves being connected with the cylinder and a port in another valve being connected with the outlet for connecting the cylinder through the valves with the outlet, the valves each having a port connected with the fluid pressure inlet for connecting the fluid pressure inlet with the cylinder, a pivoted frame having a thermostatic means and an arm with a member for traveling in the guiding path of the guideway, an operating arm pivoted to the frame and operable by the thermostatic means, the operating arm having a limited movement relatively to the frame and serving to operate one of the valves, a thermostatic means serving to operate another valve, and a pilot control serving to operate the third valve.

13. In a heat controlling apparatus, a cylinder, a piston in the cylinder, a burner valve, a guideway, means by which the piston is adapted to operate the burner valve and to move the guideway relatively to the cylinder and at an angle to its guiding path, a fluid pressure inlet, an outlet, two valves having ports connected with each other, a port in one of the valves being connected with the cylinder and a port in another valve being connected with the outlet for connecting the cylinder through the valves with the outlet, the valves each having a port connected with the fluid pressure inlet for connecting the fluid pressure inlet with the cylinder, a pivoted frame having a thermostatic means and an arm with a member for traveling in the guiding path of the guideway, an operating arm pivoted to the frame and operable by the thermostatic means, the operating arm having a limited movement relatively to the frame and serving to operate one of the valves, magnetic means for operating another valve, a thermostatic means having a battery and circuits leading to the magnetic means, and a circuit opening and closing means on the first mentioned means for directing the current through the circuits with reference to the position of the first mentioned means relatively to the cylinder.

14. In a heat controlling apparatus, a cylinder, a piston in the cylinder, a burner valve, a guideway, means by which the piston is adapted to operate the burner valve and to move the guideway relatively to its guiding path, a fluid pressure inlet, an outlet, a valve having ports connected with the cylinder, the outlet and the fluid pressure inlet, a thermostatic means for operating the last mentioned valve having a controlling member movable in the guideway to be operated thereby.

15. In a heat controlling apparatus, a cylinder, a piston in the cylinder, a burner valve, a guideway, means by which the piston is adapted to operate the burner valve and to move the guideway relatively to its guiding path, a fluid pressure inlet, an outlet, a valve having ports connected with the cylinder, the outlet and the fluid pressure inlet, a pivoted frame having a crank with a guide disposed in the guideway, an arm pivoted to the frame and having a limited movement relatively thereto, the arm being disposed for operating the valve, and a thermostatic means on the frame for moving the arm relatively to the frame.

16. In a heat controlling apparatus, a cylinder, a piston in the cylinder, a burner valve, a guideway, means by which the piston is adapted to operate the burner valve and to move the guideway relatively to its guiding path, a fluid pressure inlet, an outlet, two valves having ports communicating with each other and with the cylinder, the outlet, and the fluid pressure inlet, a pivoted frame having a crank with a guide disposed in the guideway, an arm pivoted to the frame and having a limited movement relatively thereto, the arm being disposed for operating one of the last two mentioned valves, a thermostatic means on the frame for moving the arm relatively to the frame, and a thermostatic means for operating the other of the last two mentioned valves and having an electrical connection which is opened and closed by the movement of the first mentioned means.

17. In a heat controlling apparatus, a cylinder having a port, a piston in the cylinder, a main burner valve, means by which the piston is adapted to operate the main burner valve, a valve for opening and closing the port, the last mentioned valve having an arm with a seat, a pilot control having a burner and a gas port, a chute leading from the seat to the gas port, a valve member normally disposed on the seat of the arm and positioned when the valve is operated to pass down the chute to seat at the pilot control burner, and means by which a difference in temperature at the pilot control is adapted to operate the last mentioned valve.

18. In a heat controlling apparatus, a main burner control including a valve having an arm with a seat, a pilot control having a gas port, a valve member normally disposed on the seat of the arm and positioned when the valve is operated to pass to the seat at the pilot control gas port, and means actuated by a difference in temperature at the pilot control for operating the valve.

19. In a heat controlling apparatus, a unitary control means including a circuit breaker, a first thermostatic means controlled by an inner temperature for operating the unitary control means operable by a circuit which is opened and closed by the circuit breaker, a second thermostatic means controlled by an environmental temperature for operating the unitary control means, and variable in its operation by the unitary control means.

20. In a heat controlling apparatus having a unitary control means including a circuit breaker and a piston in a cylinder, an outlet, a fluid pressure inlet, two valves communicating with each other, with the outlet and with the fluid pressure inlet to afford communication between the fluid pressure inlet and the cylinder and the cylinder and the outlet, a thermostatic means for operating one of the valves operable by a circuit which is opened and closed by the circuit breaker, and a second thermostatic means for operating the other valve.

21. In a heat controlling apparatus having a unitary control means including a circuit breaker and a piston in a cylinder, an outlet, a fluid pressure inlet, two valves communicating with each other, with the outlet and with the fluid pressure inlet to afford communication between the fluid pressure inlet and the cylinder and the cylinder and the outlet, a thermostatic means for operating one of the valves operable by a circuit which is opened and closed by the circuit breaker, and a second thermostatic means for operating the other valve and adjustable by the unitary control means.

22. In a heat controlling apparatus, a fluid pressure means, an outlet, a fluid pressure inlet, three valves having ports affording communication through the valves, between the fluid pressure means and the outlet, each of the valves having an additional port connected with the inlet and serving to introduce a fluid from the fluid pressure inlet to the fluid pressure means, two thermostatic means operatively connected with two of the valves respectively, and a pilot control means operatively connected with the other valve.

23. In a heat controlling apparatus, a fluid pressure means, an outlet, a fluid pressure inlet, two valves having ports affording communication through the valves, between the fluid pressure means and the outlet, each of the valves having an additional port connected with the inlet and serving to introduce a fluid from the fluid pressure inlet to the fluid pressure means, and two thermostatic means for operating the valves respectively.

24. In a heat controlling apparatus, a fluid pressure means, an outlet, a fluid pressure inlet, two valves having ports affording communication through the valves, between the fluid pressure means and the outlet, each of the valves having an additional port connected with the inlet and serving to introduce a fluid from the fluid pressure inlet to the fluid pressure means, two thermostatic means for operating the valves respectively, and means on a movable member of the fluid pressure means for adjusting one of the thermostatic means.

25. An outside thermostat, an inside thermostat, a heat control mechanism, a control for the mechanism including a member shiftable by change in the inside thermostat, and a settable connection between said member and the outside thermostat to enable the outside thermostat to independently and variably inhibit such change.

26. A heat control mechanism, a thermostatic control device including a lever, a valve for the mechanism, and arms for controlling the valve adapted to be swung by said lever during part of its throw and remaining clear of the lever during the remainder of its throw.

27. A heat control device, a member shiftable to position said device, an inside thermostat adapted to shift said member, an outside thermostat, and adjustable means dependent on the position of the member for enabling said outside thermostat to position the member.

28. A heat control device, a member shiftable to position said device, an inside thermostat adapted to shift said member, an outside thermostat, a lever movable by said outside thermostat, a connection whereby said lever may move said device, and a pivot for the lever movable by said member to determine whether said connection shall be effective.

29. A heat control device, a member shiftable to position said device, an inside thermostat adapted to shift said member, an outside thermostat, a lever movable over a wide swing by said outside thermostat, a control for said member shiftable by said lever over a part of its throw, and a pivot for the lever movable by the member to vary the part of the throw of the lever in which it shifts the member.

30. A heat control device, a valve, a member shiftable to position said device, an inside thermostat adapted to shift said member, an outside thermostat, a device shiftable by the outside thermostat to cause the valve to alter the position of the heat control device, said device adapted to move ineffectively before or after moving the valve and also adapted to set the valve at neutral position.

31. In a heat control device, a fluid operated piston, an inside thermostat, a valve operated thereby to deliver fluid to the piston, an outside thermostat, a second valve operated thereby to deliver fluid through the first valve to the piston, and means dependent on the position of the piston for determining when the outside thermostat will be effective on its valve.

32. An outside thermostat, an inside thermostat, a heat control mechanism including a power driven member controlled by said thermostats, a positive drive for said member made effective or released by the inside thermostat, means normally tending to move said member against said power drive, and an outside thermostat adapted to block release by the inside thermostat.

33. In a heat controlling apparatus, a first thermostatic device connected to be controlled by an outer environmental temperature, a second thermostatic device connected to be controlled by an inner temperature, and a movable member in said apparatus adapted to be moved as controlled by the thermostats, and a cam connected to the movable member for varying the operation of the first thermostatic device.

34. In a heating system the combination with a thermostatically operated member, of a fluid-pressure-operated plunger for controlling the heat provided by the system, a valve having a position for admitting pressure to the plunger and a position relieving pressure from the plunger and a holding position, an operating device between the member and the valve having a travel in which it moves idly over a large part of its travel and also moves the valve through the three positions, and means operated in unison with the plunger for altering the point in the travel of the device in which it moves the valve.

35. In a heating system, the combination with a thermostatically operated expansion member, of a fluid pressure-operated plunger for controlling the heat provided by the system, a valve having a position for admitting pressure to the plunger and a position for relieving pressure from the plunger and a holding position, an operating device between the expansion member and the valve having a travel in which it moves idly over a large part of its travel and also moves the valve through the three positions, a mounting for the expansion member, and means operated in unison with the movement of the plunger for shifting the mounting to alter the point in the travel of the operating device at which the valve is in holding position.

36. In a heating system, the combination with a thermostatically operated expansion member, of a fluid-pressure-operated plunger for controlling the heat provided by the system, a valve controlling the fluid, a travelling operating device between the expansion member and the valve adapted to operate the valve over part of its travel and to move idly over the remainder of its travel, a mounting for the expansion member, and a connection from the plunger to the mounting adapted to shift the temperature at which the operating device operates the valve.

37. A thermostat including a liquid-operated bellows, a mounting for the bellows, a travelling element adapted to control a source of heat, a valve controlling power for driving the travelling member in either of two directions or for holding it against travel, an arm moved by the bellows and setting the valve at various points of its movement, and a device moved by the travelling element to shift the mounting and cause the arm to set the valve at another point in its movement.

38. In a heating system the combination with a thermostatically operated bellows, a heat-delivering device, a valve for controlling the heat delivering device, a swinging arm driven by said bellows to turn said valve during a small part of its swing and to move idly over the greater part of its swing, and a single spring holding said arm against said bellows and serving to reversely turn the valve.

39. In a heating system the combination with a thermostatically operated member, of a fluid pressure-operated plunger for controlling the heat provided by the system, a valve having a position for admitting pressure to the plunger and a position relieving pressure from the plunger and a holding position, an operating device between the member and the valve having a travel limited only by the member operating it, and operating the valve only at a narrow range of its travel, and means operated in unison with the plunger for altering the point in the travel of the device in which it moves the valve.

40. In a unitary heat controlled device, a source of fluid power, a moving element driven by the source of power, a first thermostatic device, a valve for the fluid power, an operating member for the valve moved by the thermostatic device so as to operate the valve over only a part of its travel, a second thermostatic device altering the part of its travel in which the operating member operates the valve.

FREDERIC C. CHADBORN.